US012774995B2

(12) United States Patent
Jaloszynski et al.

(10) Patent No.: US 12,774,995 B2
(45) Date of Patent: Oct. 27, 2026

(54) UNRESOLVED COMPLEX MIXTURE SEPARATION OF DATA COLLECTED IN TWO-DIMENSIONAL GAS CHROMATOGRAPHY

(71) Applicant: LECO Corporation, St. Joseph, MI (US)

(72) Inventors: Jonathan Jaloszynski, Saint Joseph, MI (US); Kevin Lee McNitt, Saint Joseph, MI (US)

(73) Assignee: LECO Corporation, St. Joseph, MI (US)

( * ) Notice: Subject to any disclaimer, the term of this patent is extended or adjusted under 35 U.S.C. 154(b) by 532 days.

(21) Appl. No.: 18/248,484

(22) PCT Filed: Oct. 12, 2021

(86) PCT No.: PCT/US2021/054598

§ 371 (c)(1),
(2) Date: Apr. 10, 2023

(87) PCT Pub. No.: WO2022/081587

PCT Pub. Date: Apr. 21, 2022

(65) Prior Publication Data

US 2023/0384272 A1 Nov. 30, 2023

Related U.S. Application Data

(60) Provisional application No. 63/090,405, filed on Oct. 12, 2020.

(51) Int. Cl.
*G01N 30/86* (2006.01)
*G01N 30/02* (2006.01)
(Continued)

(52) U.S. Cl.
CPC ....... *G01N 30/8631* (2013.01); *G01N 30/463* (2013.01); *G01N 2030/025* (2013.01);
(Continued)

(58) Field of Classification Search
CPC .. G01N 30/8631; G01N 30/463; G01N 30/86; G01N 2030/025; G01N 30/8624; G01N 30/14
See application file for complete search history.

(56) References Cited

U.S. PATENT DOCUMENTS 5,135,549 A * 8/1992 Phillips .................. G01N 30/30 95/8
5,196,039 A * 3/1993 Phillips ................ G01N 30/463 95/82
(Continued)

FOREIGN PATENT DOCUMENTS

CN 101236184 A 8/2008
CN 107076712 A 8/2017
(Continued)

OTHER PUBLICATIONS

LECO Corporation ("How GCxGC Increases Routine Laboratory Performance". AZoM. Jul. 16, 2018. https://www.azom.com/article.aspx?ArticleID=16323) (Year: 2018).*
(Continued)

*Primary Examiner* — Christian T Bryant
(74) *Attorney, Agent, or Firm* — Honigman LLP; Thomas J. Appledorn; Grant Griffith

(57) ABSTRACT

Systems and methods for processing data in a two-dimensional chromatograph are disclosed. In some implementations, the data includes information associated with resolved peaks and information associated with an unresolved complex mixture, and such systems and methods may attenuate the information associated with the resolved peaks from the
(Continued)

data to substantially isolate the information associated with the unresolved complex mixture.

13 Claims, 9 Drawing Sheets

(51) Int. Cl.
*G01N 30/14* (2006.01)
*G01N 30/46* (2006.01)

(52) U.S. Cl.
CPC ............. *G01N 30/14* (2013.01); *G01N 30/86* (2013.01); *G01N 30/8624* (2013.01)

(56) References Cited

U.S. PATENT DOCUMENTS

| | | | | |
|---|---|---|---|---|
| 10,020,173 | B2 | 7/2018 | Yamaguchi | |
| 2008/0180447 | A1* | 7/2008 | Bertoncini | G01N 30/8631 345/440.1 |
| 2010/0127860 | A1* | 5/2010 | Ganguly | G01N 30/8693 73/61.53 |
| 2014/0067308 | A1* | 3/2014 | Cunnien | G01N 33/00 702/100 |
| 2015/0198573 | A1 | 7/2015 | Habel | |
| 2020/0072801 | A1* | 3/2020 | Stallone | G01N 30/30 |

FOREIGN PATENT DOCUMENTS

| | | | |
|---|---|---|---|
| CN | 111413420 | A | 7/2020 |
| JP | 2008185586 | A | 8/2008 |
| JP | 2009008570 | A | 1/2009 |
| JP | 6260709 | B2 | 1/2018 |
| WO | 2014064790 | A1 | 5/2014 |

OTHER PUBLICATIONS

Newmiller (“Rules of Thumb for GCxGC Success: How to Maximize GCxGC Method Performance Using 3 Simple Steps”. LECO News. Jun. 18, 2018. https://www.leco.com/news/rules-of-thumb-for-gcxgc-success/) (Year: 2018).*

Snow (âGCxGC: From Research to Routinea, LCGC North America, vol. 37, Issue 2, pp. 92â101, 130, Feb. 1, 2019) (Year: 2019).*

International Preliminary Report on Patentability and Written Opinion for Application PCT/US2021/054598 dated Apr. 13, 2023.

Korean Intellectual Property Office, International Search Report and Written Opinion for Application No. PCT/US2021/054598 dated Jan. 28, 2022.

Japanese Patent Office, Office Action for Application No. 2023-516134 dated Nov. 2, 2023.

Biedermann, et al., Comprehensive two-dimensional GC after HPLC preseparation for the characterization of aromatic hydrocarbons of mineral oil origin in contaminated sunflower oil, J. Sep. Sci. 2009, 32, 3726-3737.

Biedermann, et al., Aromatic Hydrocarbons of Mineral Oil Origin in Foods: Method for Determining the Total Concentration and First Results, J. Agric. Food Chem. 2009, 57, 8711-8721.

Office Action from corresponding British application No. GB2303480.4 mailed Sep. 23, 2025, all enclosed pages cited.

* cited by examiner

UNRESOLVED COMPLEX MIXTURE SEPARATION OF DATA COLLECTED IN TWO-DIMENSIONAL GAS CHROMATOGRAPHY

CROSS REFERENCE TO RELATED APPLICATION

The present application is a 371 National Stage entry based on International Application No. PCT/US2021/054598, filed on Oct. 12, 2021, which claims priority under 35 U.S.C. § 119(e) to U.S. Provisional Application No. 63/090,405, filed on Oct. 12, 2020. The disclosures of these prior applications are considered part of the disclosure of this application and are hereby incorporated by reference in their entireties.

BACKGROUND

Gas chromatography is used to separate and analyze compounds in a variety of applications and across a number of disciplines. Traditional gas chromatography can involve the combination of a sample to be tested with a carrier gas (e.g., helium or hydrogen) within a column to form an effluent. As the effluent moves through the column, various compounds may be separated from one another due to flow characteristics. Upon exiting the column, the separated compounds may be detected and analyzed.

When two or more compounds of a sample have similar characteristics, it can be difficult to separate such compounds because they may tend to move at similar velocities through the column such that a sufficient amount of separation does not occur. To address the foregoing and improve the resolution of the analysis, rather than using a single column, a technique has been implemented whereby portions of the effluent are periodically injected into a second column, whereby the second column possesses one or more different characteristics than the first column. This is known as two-dimensional gas chromatography (GC×GC). The invention disclosed herein advances the art and provides a means that facilitates the analysis of the data obtained in such two-dimensional systems.

DESCRIPTION OF DRAWINGS

Like reference symbols in the various drawings indicate like elements.

DETAILED DESCRIPTION

The following description of the various embodiments is merely exemplary in nature and is in no way indented to limit the scope of the invention, its application or uses. For brevity, the disclosure hereof will illustrate and describe a modulated gas chromatography system in various embodiments. Based on the foregoing, it is to be generally understood that the nomenclature used herein is simply for convenience and the terms used to describe the invention should be given the broadest meaning by one of ordinary skill in the art.

Figure 1:
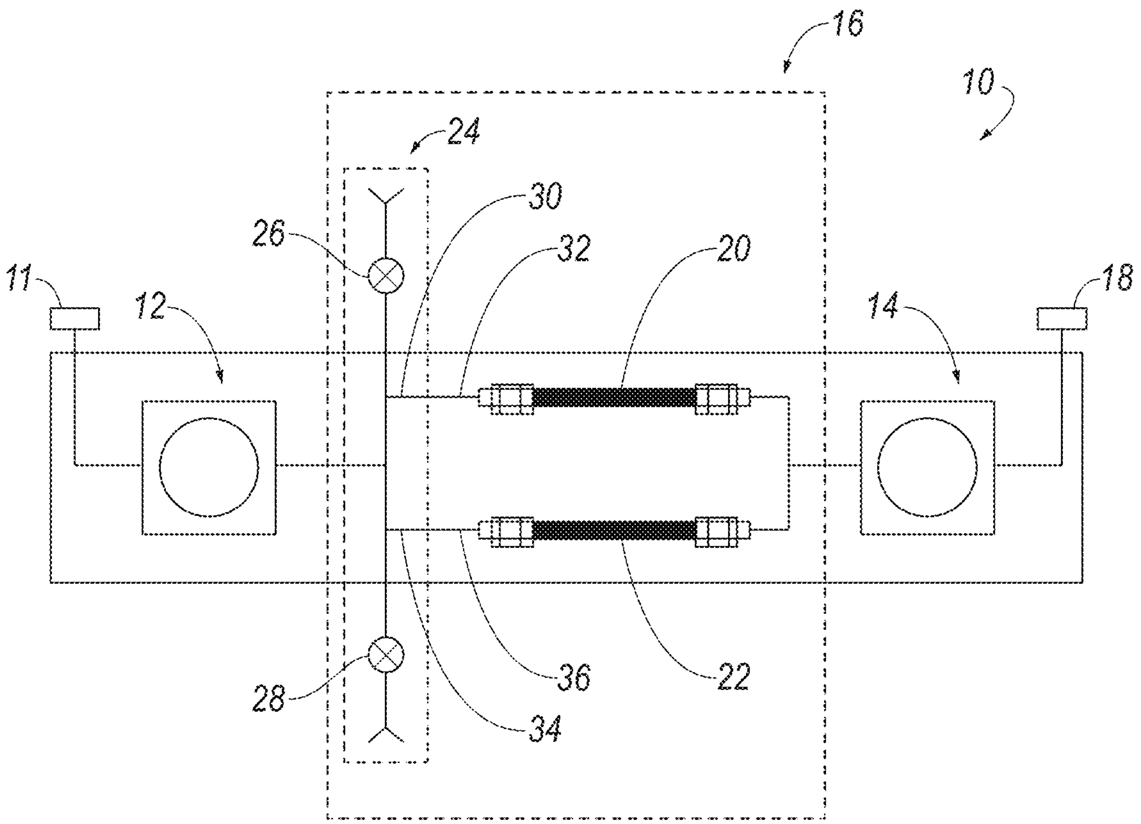
FIG. 1 is a schematic view a two-dimensional chromatographic system.

Referring to FIG. 1, a gas chromatograph 10 is shown. In an implementation, chromatograph 10 includes a first column (or capillary) 12, a second column (or capillary) 14, a modulation system 16 between first column 12 and second column 14, a detector 18 and an injector 11.

The principles described herein may be applied in any two-dimensional chromatographic system and, for brevity, details of the chromatograph 10 need not be hereafter explained. Instead, the remaining disclosure discusses methods and processes to substantially mute (or attenuate) the resolved analytes in the data collected by detector 10 to thereby substantially isolate the data representing the unresolved mixture. Detector 10 may be any detector suitable for two-dimensional systems. For example, and without limitation, detector may be an electron capture detector, a thermal conductivity detector, a photoionization detector, a flame ionization detector, a flame photometric detector, a mass spectrometer, a photometric detectors (such as, for example, ultraviolet, visible light, and the like), an atomic emission detector, a nitrogen phosphorous detector, a sulfur chemiluminescence detector, and the like.

Figure 2:
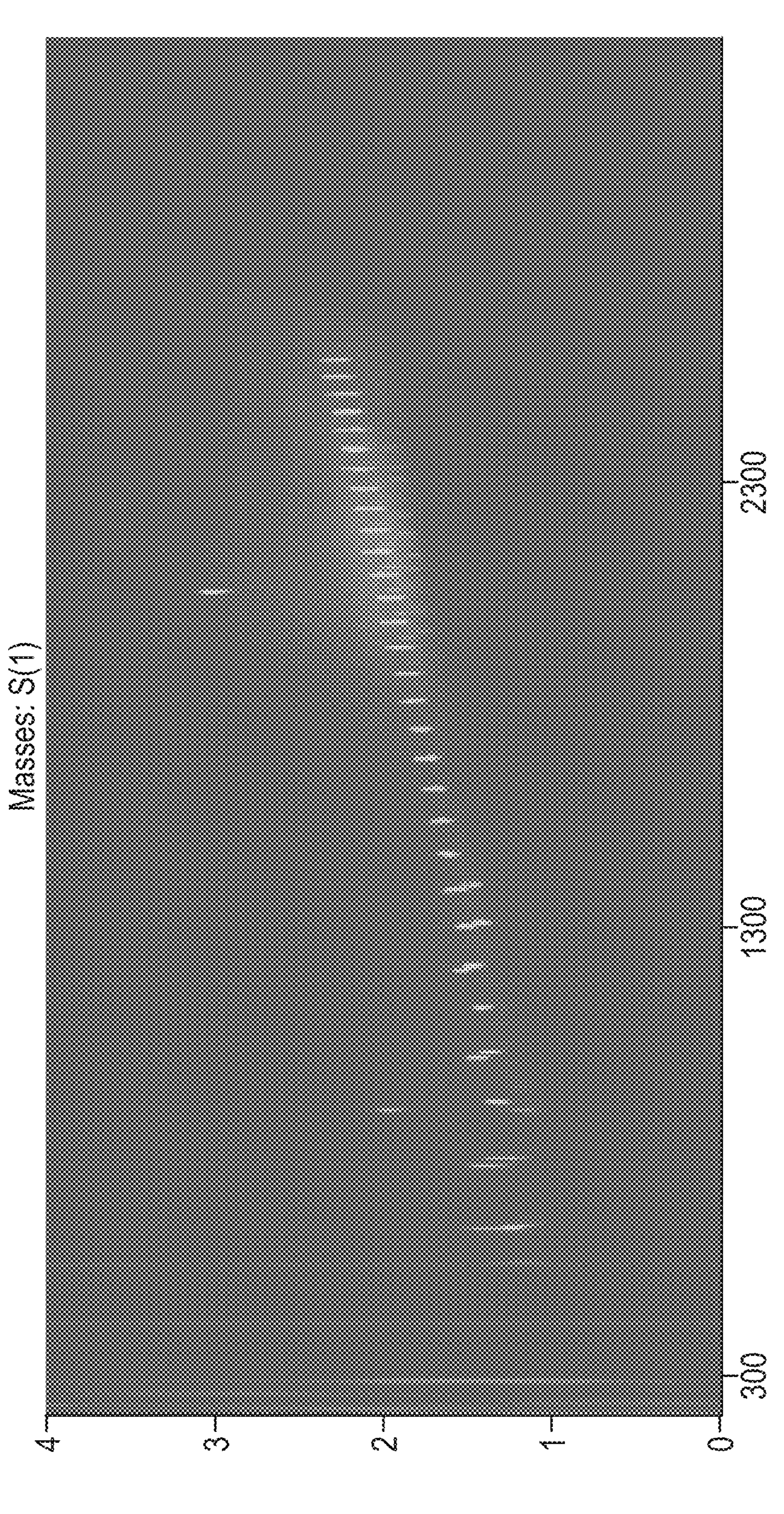
FIG. 2 is an example of a contour plot that illustrates raw data that may be collected by the detector and includes both an unresolved complex mixture and a number of clearly resolved chromatographic peaks.

In an implementation of a two-dimensional system, such as system 10, the data (D) collected by detector 40 may be collected and represented in the form of a linear data stream and collected and processed in a mathematical matrix ($M_{raw}$), which, if desired, may be plotted on a two-dimensional plane (e.g., a contour plot) such as the one shown in FIG. 2 (where, for illustration, the contour plot peaks are represented by a color scale of intensity.) User-defined parameters (such as, for example, modulation period (the time required between each modulation cycle and, therefore, each rapid second column separation) and the total run time) are used in the example below to define retention time on each axis of the contour plot.

The principles that are herein described can be applied in a GC×GC system that use static modulation times as well as GC×GC systems that apply variable modulation times. The embodiment discussed below describes a process in which the modulation time is maintained static yet the scope of the claims should not be constrained to but one example, or application, of the process.

In practice, it can be desirable to attenuate the resolved analytes that are represented in the information to substantially isolate the unresolved mixture.

In an implementation, a method may include the steps of (i) deriving raw one-dimensional representations for a plurality of second-dimension retention times that comprises data collected for each such second retention time, wherein each raw one-dimensional representation includes a number of points that have an intensity for each first column retention (e.g., an x-axis value) time (e.g., a y-axis value); (ii) substantially isolating the information representing an unresolved mixture that is included in the data in each of the raw one-dimensional representations so that the information related to the resolved analytes contained therein is substantially attenuated, and (iii) recombining the one-dimensional representations comprising the isolated information to yield a two-dimensional representation of the unresolved mixture.

Figure 3:
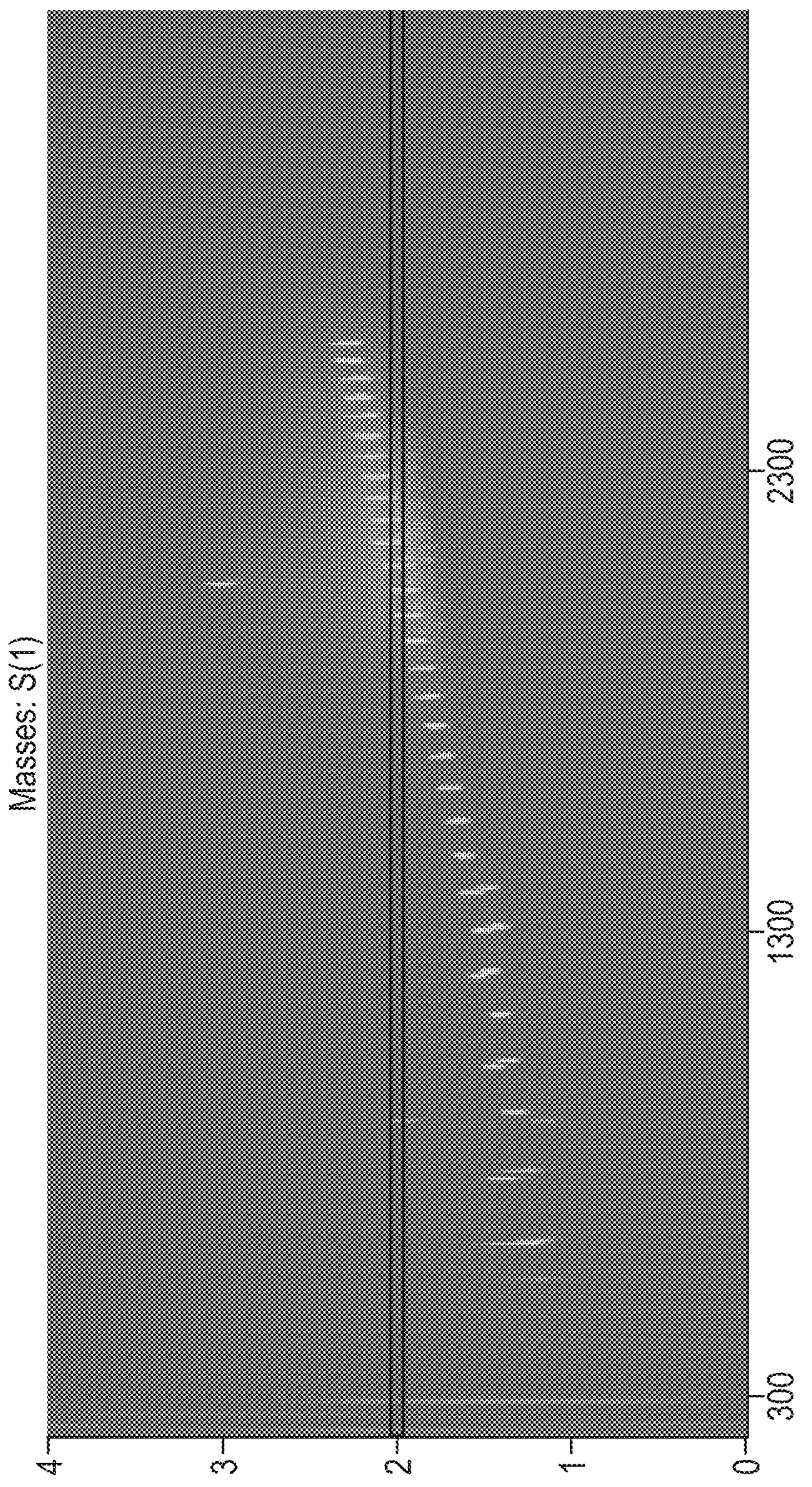
FIG. 3 provides a visual illustration to show an example of a process to extract one or more sets of one-dimensional information from the data that is visually represented in the contour plot of FIG. 2, wherein the box taken along the y-axis (second dimension retention time) and the data contained therein provides information about the intensity of each modulation at such second dimension retention time.
Figure 4:
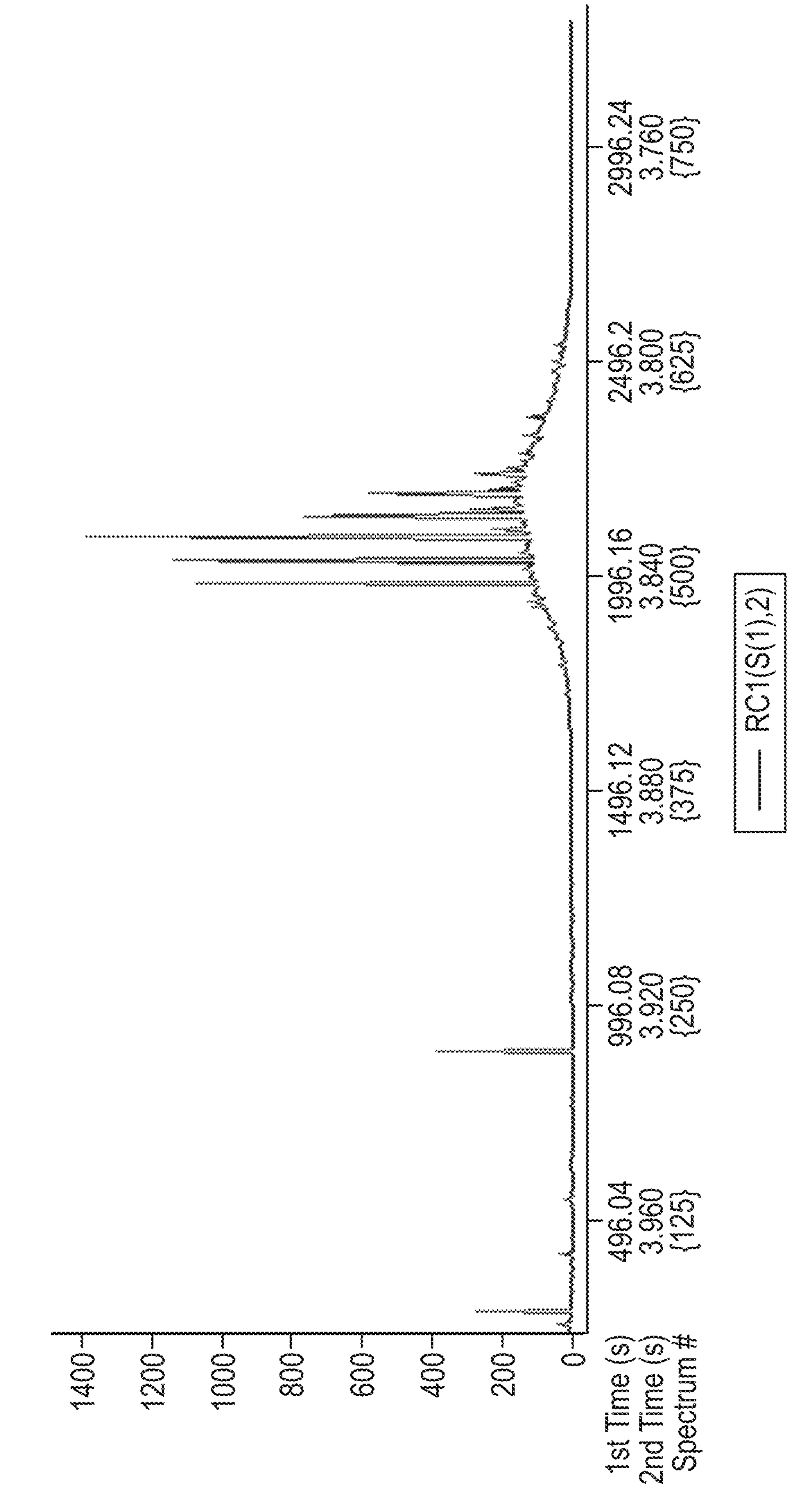
FIG. 4 provides a visual illustration of the extracted data from FIG. 3, wherein the x-axis is the first dimension retention time and the y-axis is the intensity (in this example, the second dimension retention time is 2 as shown in FIG. 3)

FIG. 3 depicts an example of a step to derive one or more sets of one-dimensional information from the data that is visually represented in the contour plot of FIG. 2, wherein the box taken along the y-axis (second dimension retention time) and the data contained therein provides information about the intensity as against the first dimension retention time (i.e., referenced modulation). And FIG. 4 provides a visual illustration of the extracted data from FIG. 3, wherein the x-axis is the first dimension retention time and the y-axis is the intensity (in this example, the second dimension retention time is 2 seconds as shown in FIG. 3).

An example of a method to substantially isolate the information representing an unresolved mixture will now be disclosed. It is to be appreciated that other methods may be utilized and the scope of the invention should not be so limited to the example unless specifically claimed.

In an implementation, the step of substantially isolating the information comprises: (i) deriving a minimum one-dimensional representation for each raw one-dimensional representation, (ii) smoothing each of the derived minimum one-dimensional representations to yield smoothed minimum one-dimensional representations, and (iii) applying a correction value to the smoothed minimum one-dimensional representations.

In an implementation, the steps of deriving a minimum one-dimensional representation for each raw one-dimensional representation and smoothing each of the derived minimum one-dimensional representation may comprise (i) for each point in each one-dimensional representation, each a subject point: (a) identifying a lowest intensity value [I(minimum)] of N points most proximate to the subject point, and (b) upon identifying the lowest intensity value [I(minimum)] for such N points, determining the mean of the identified lowest intensity values [I(minimum)] for the nearest N points to the subject point, and (c) assigning the determined mean as the smoothed minimum intensity [I(smoothed minimum)] for the subject point. In an implementation, N may be 11 but it is to be appreciated that other values may be utilized and the invention should not be limited to the example described. In an alternate system that employs a variable modulation, N may be altered, in part, as a function of the modulation time. For example, and without limitation, N be determined as a function of the length of the modulation (e.g., a shorter modulation period may result in increasing N as there are more modulations across a peak in the first dimension.)

Figure 5:
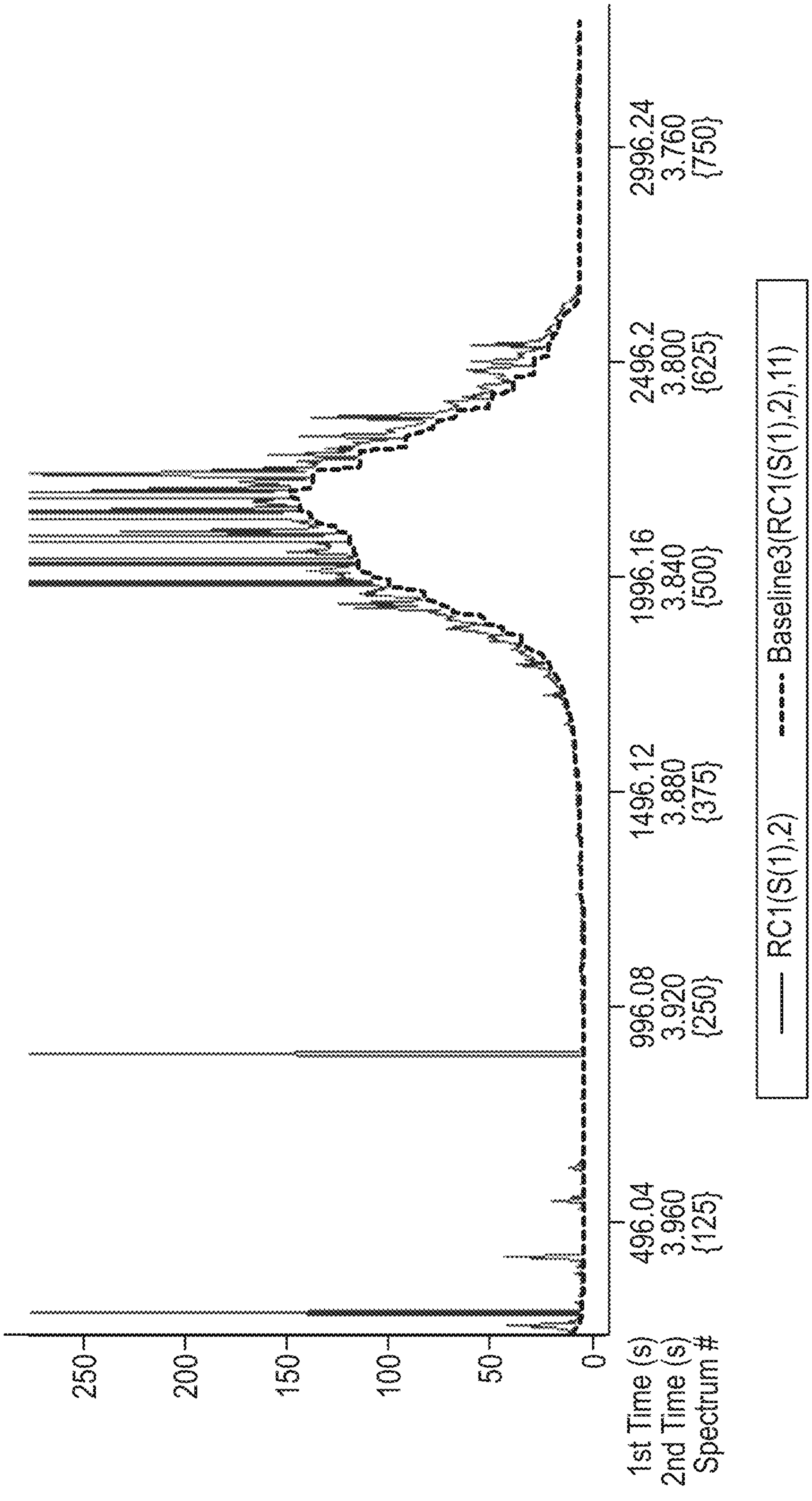
FIG. 5 provides a visual illustration of the signal from FIG. 4 and includes the minimum intensity value for each point as determined according to a process described herein (as compared to the raw data, also shown), noting that the y-axis (intensity) is reduced to highlight the difference in minimum value for each point as compared to the intensity of each point in the raw data of FIG. 4.

FIG. 5 provides a visual illustration of the signal from FIG. 4 and includes the minimum intensity value for each point as determined according to a process described above (as compared to the raw data, also shown), noting that the y-axis (intensity) is reduced to highlight the difference in minimum value for each point as compared to the intensity of each point in the raw data of FIG. 4.

Figure 6:
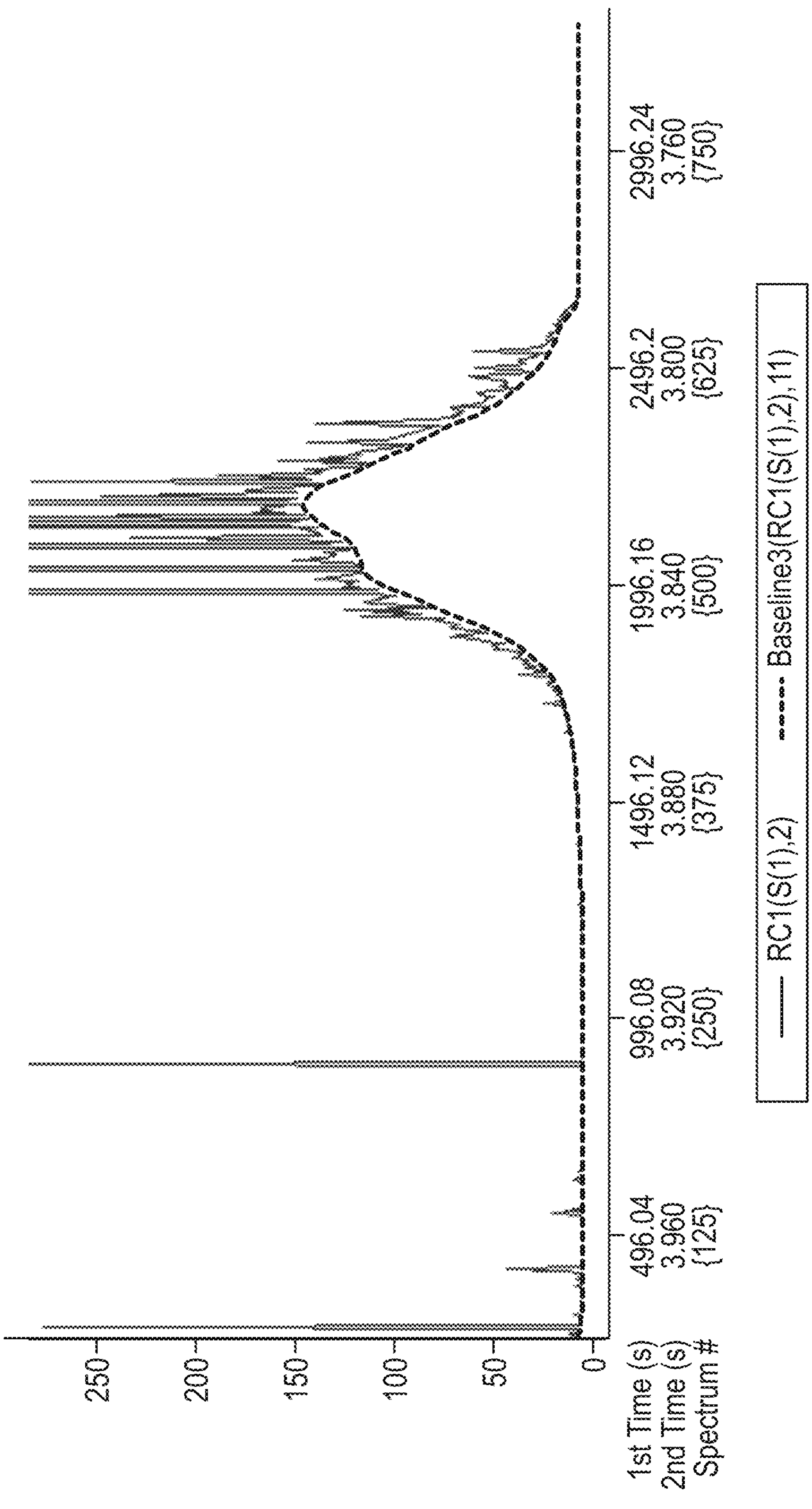
FIG. 6 provides a visual illustration of the signal from FIG. 5 and illustrates the intensity values for each point following the application of a smoothing function to the minimum intensity values shown in FIG. 5 (as compared to the raw data, also shown)

FIG. 6 provides a visual illustration of the signal from FIG. 5 and illustrates the intensity values for each point following the application of a smoothing function to the minimum intensity values shown in FIG. 5 (as compared to the raw data, also shown).

Next, a correction value may be applied to the smoothed minimum intensity values. For example, and without limitation, in an implementation the correction value may be calculated as follows for each point in each smoothed minimum one-dimensional representation, each a subject point: (a) referencing Y points most proximate to the subject point, (b) for each referenced point, determining the difference of the smoothed minimum intensity for such point from the raw intensity of such point, (c) sorting the determined differences in ascending order, (d) computing the Hodges Lehmann statistic on the bottom fifty-percent of the sorted determined differences, and (e) adding that statistic to the smoothed minimum intensity [I(smoothed minimum)] for the subject point to yield a corrected smoothed minimum intensity [I(corrected smoothed minimum intensity)] for such point.

Figure 7:
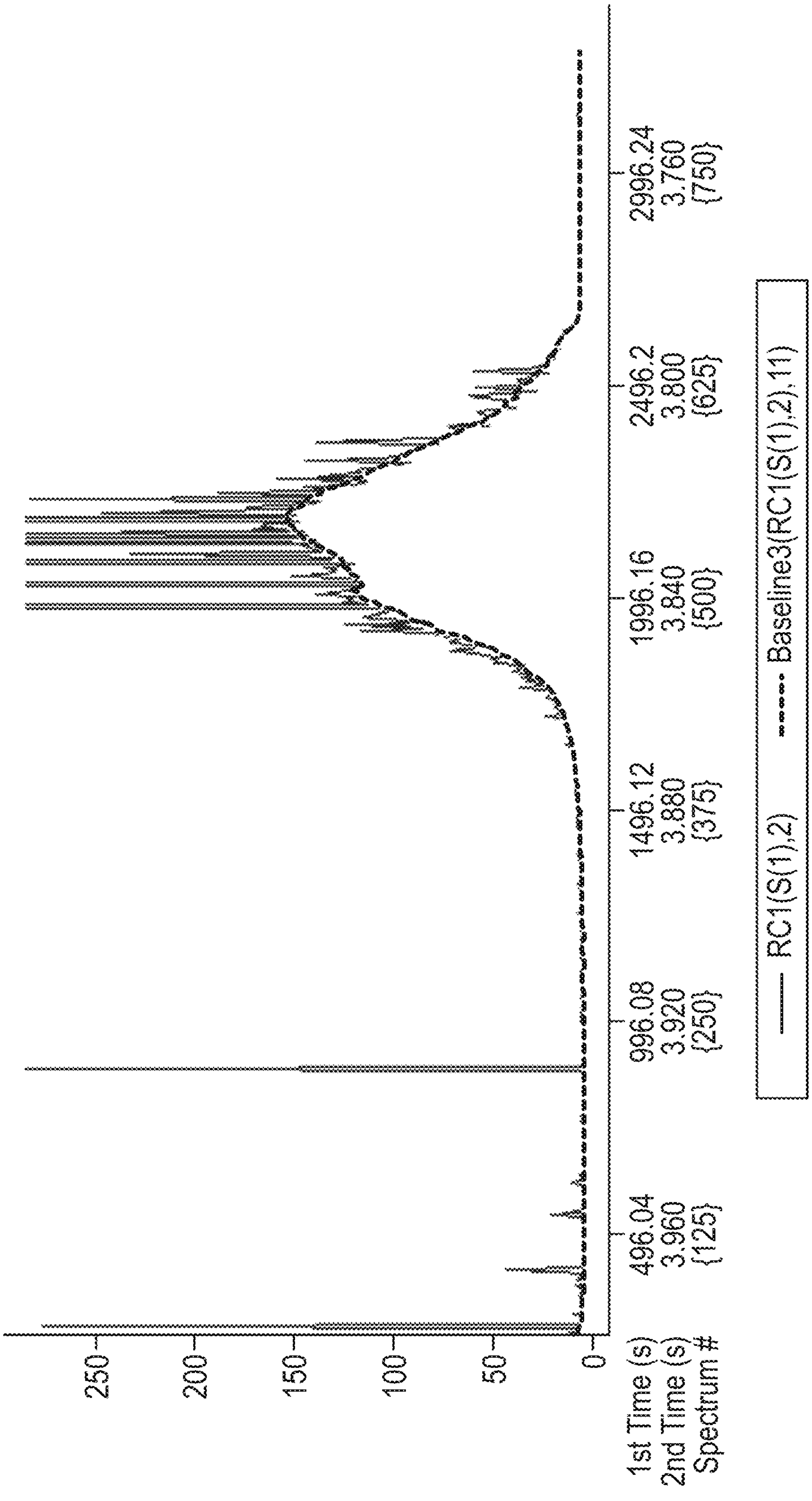
FIG. 7 provides a visual illustration of the signal from FIG. 6 following the application of a correction value to each point, wherein the signal approximates the unresolved complex mixture at such constant second dimension retention time (in this example, 2)

FIG. 7 provides a visual illustration of the signal from FIG. 6 following the application of a correction value to each point, wherein the signal approximates the unresolved complex mixture at such constant first dimension retention time (in this example, 2).

In an implementation, Y may be 11 but it is appreciated that other values may be utilized and the invention should not be limited to the exemplary value.

Figure 8:
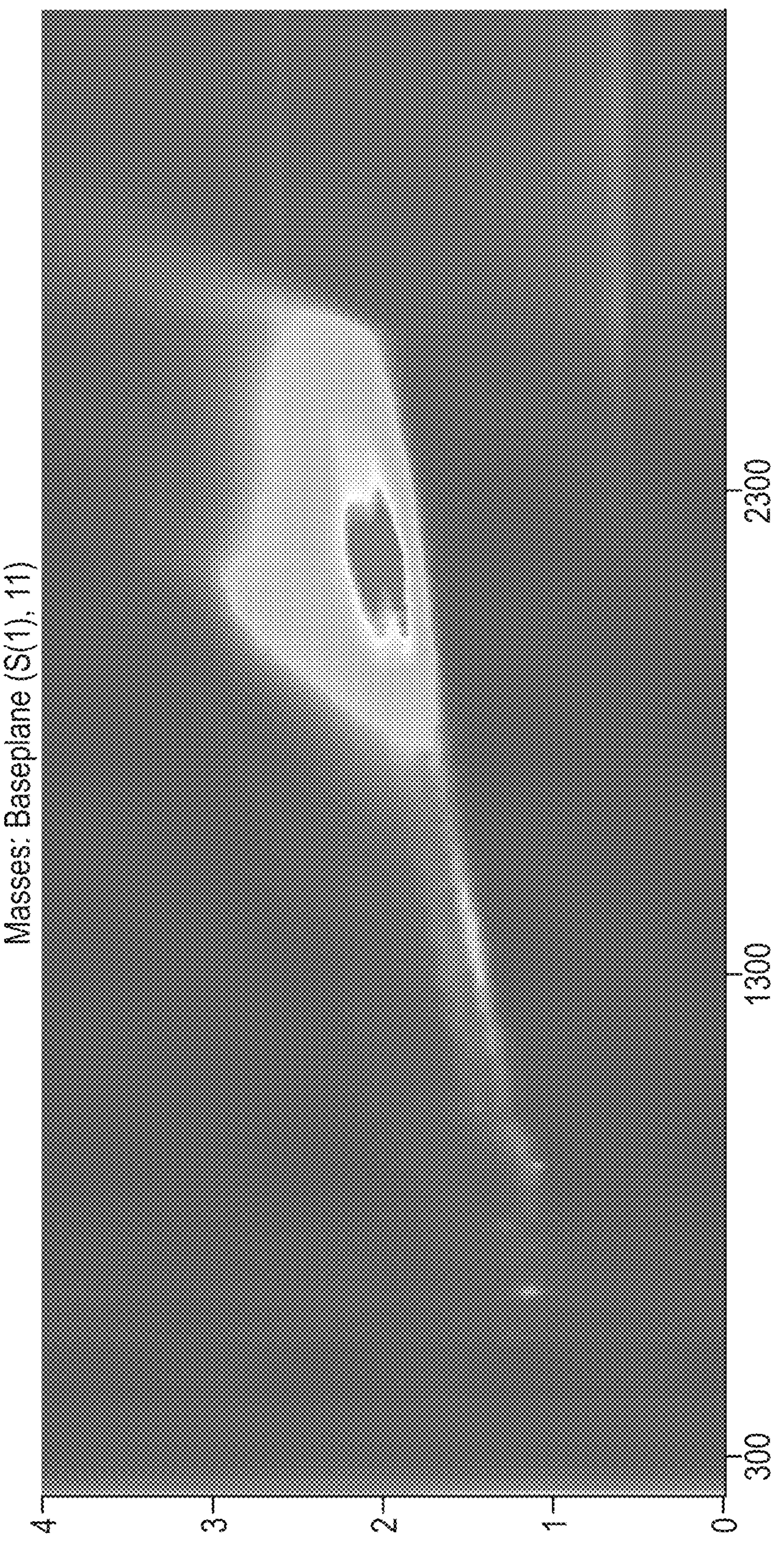
FIG. 8 provides a visual illustration of a modified contour plot of FIG. 2, which represents the unresolved complex mixture with the clearly resolved chromatographic peaks thereby muted (due to the application of the minimum intensity value, the smoothing function, and the correction value to each of the one or more sets of one-dimensional information)

As discussed above, once the corrected smoothed minimum intensity is determined for each point on each one-dimensional representation, the modified one-dimensional representations are stitched back together and thereby substantially represent the unresolved complex mixture with the resolved analytes substantially attenuated therefrom. FIG. 8 provides a visual illustration of a modified contour plot of FIG. 2, which represents the unresolved complex mixture with the clearly resolved chromatographic peaks thereby muted (due to the application of the minimum intensity value, the smoothing function, and the correction value to each of the one or more sets of one-dimensional information.)

An example of another method to substantially isolate the information representing an unresolved mixture will now be disclosed. Referring back to FIG. 2, the step of isolating the information can be undertaken on the three-dimensional data without breaking it into the one-dimensional pieces described with respect to FIG. 3-FIG. 7. Instead, the step of isolating the information comprises undertaking the following steps for each point in the raw data in which such isolation is sought: (i) deriving a minimum two-dimensional representation for each raw two-dimensional representation, (ii) smoothing each of the derived minimum two-dimensional representations to yield smoothed minimum two-dimensional representations, and (iii) applying a correction value to the smoothed minimum two-dimensional representations.

Figure 9:
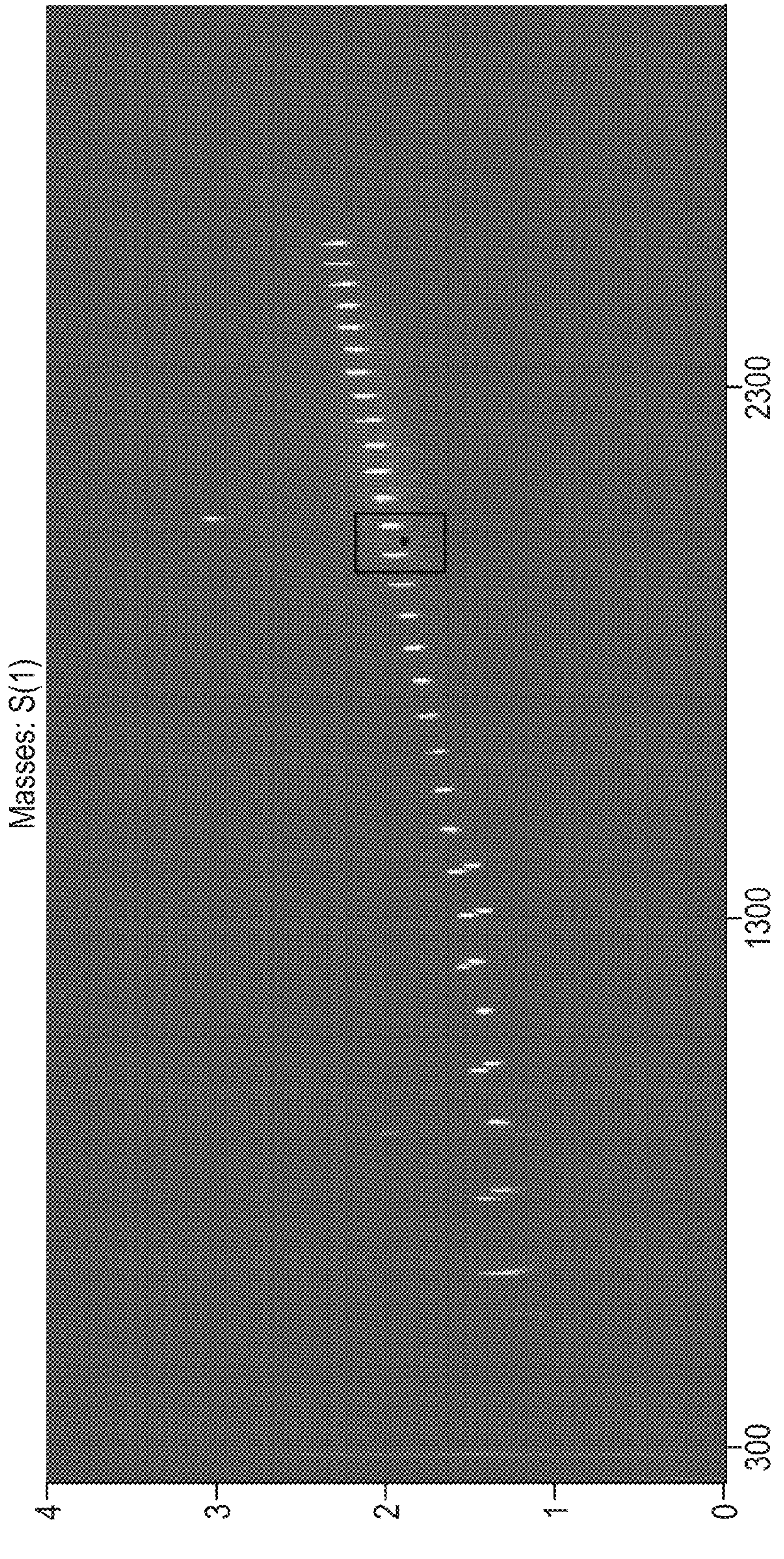
FIG. 9 is a depiction of a contour plot that illustrates an example of a window that may be extended about a reference point in the plot where the window is sized N (first retention time) by M (second dimension time) in which the points that are included in the window are utilized to affect the value of the intensity of such point as described below.

In an implementation, the steps of deriving a minimum two-dimensional representation for each raw two-dimensional representation and smoothing each of the derived minimum two-dimensional representation may comprise (i) for each point in each two-dimensional representation, each a subject point: (a) identifying a lowest intensity value [I(minimum)] of the points most proximate to the subject point in both dimensions that are encompassed by a window extending about a size N in the first dimension and M in the second dimension (as shown on FIG. 9), and (b) upon identifying the lowest intensity value [I(minimum)] for such point, determining the mean of the identified lowest intensity values [I(minimum)] of all such points in such window, and (c) assigning the determined mean as the smoothed minimum intensity [I(smoothed minimum)] for the subject point.

As described above in the one-dimensional application, a correction value may be applied to the smoothed minimum intensity values. For example, and without limitation, in an implementation the correction value may be calculated as follows for each point in each smoothed minimum two-dimensional representation, each a subject point: (a) referencing Y points most proximate to the subject point (in both dimensions), (b) for each referenced point, determining the difference of the smoothed minimum intensity for such point from the raw intensity of such point, (c) sorting the determined differences in ascending order, (d) computing the Hodges Lehmann statistic on the bottom fifty-percent of the sorted determined differences, and (e) adding that statistic to the smoothed minimum intensity [I(smoothed minimum)] for the subject point to yield a corrected smoothed minimum intensity [I(corrected smoothed minimum intensity)] for such point. The result of the application of this process yields a representation of the unresolved complex mixture with the resolved analytes substantially attenuated therefrom.

It is to be appreciated that other correction factors could be utilized which may include, for example, the first percentile of pairwise averages. In an implementation, the correction factor includes a process to discard, or substantially minimize, the large values as these values are likely associated with the top of resolved peaks.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, e-ink, projection systems, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method for processing data in a two-dimensional chromatograph, wherein the data includes information associated with resolved peaks and information associated with an unresolved complex mixture, the method comprising:

obtaining the data in the two-dimensional chromatograph;

attenuating the information associated with the resolved peaks from the data to isolate the information associated with the unresolved complex mixture, wherein the data includes information, in the form of a plurality of points, that associates intensity with first retention time in a first column of the chromatograph and second retention time in a second column of the chromatograph, and wherein the information is attenuated by:

deriving a minimum intensity for each of the plurality of points;

smoothing each of the derived minimum intensities to yield smoothed representations; and applying a correction value to the smoothed representations; and modifying a visual output representing the data that shows the information associated with the unresolved complex mixture with the information associated with the resolved peaks muted.

2. A method for processing data in a two-dimensional chromatograph as set forth in claim 1, wherein the steps of deriving a minimum intensity for each of the plurality of points and smoothing each of the derived minimum intensities comprises:

for each point, each a subject point: (a) identifying a lowest intensity value [I(minimum)] of points most proximate to the subject point, and (b) upon identifying the lowest intensity value [I(minimum)] for such points, determining the mean of the identified lowest intensity values [I(minimum)] for the nearest points to the subject point, and (c) assigning the determined mean as the smoothed representation [I(smoothed minimum)] for the subject point.

3. A method for processing data in a two-dimensional chromatograph as set forth in claim 2, wherein the points most proximate to the subject point may be in either dimension (i.e., the first retention time or the second retention time).

4. A method for processing data in a two-dimensional chromatograph as set forth in claim 3, wherein the step of applying a correction value comprises:

for each point in each smoothed representation, each a subject point: (a) referencing Y points most proximate to the subject point, (b) for each referenced point, determining a difference of the minimum intensity for such point from a raw intensity of such point, (c) sorting the determined differences in ascending order, (d) computing the Hodges Lehmann statistic on the bottom fifty-percent of the sorted determined differences, and (e) adding that statistic to the smoothed representation [I(smoothed minimum)] for the subject point to yield a corrected smoothed representation [I(corrected smoothed minimum intensity)] for such point.

5. A method for processing data in a two-dimensional chromatograph as set forth in claim 4, wherein the Y points most proximate to the subject point may be in either dimension (i.e., the first retention time or the second retention time).

6. A method for processing data in a two-dimensional chromatograph as set forth in claim 1, wherein the first retention time and the second retention time are constant.

7. A method for processing data in a two-dimensional chromatograph as set forth in claim 1, wherein the first retention time and the second retention time are variable.

8. A method for processing data in a two-dimensional chromatograph as set forth in claim 1, further comprising:

deriving the resolved peaks from the data.

9. A method for processing data in a two-dimensional chromatograph, wherein the data includes information associated with resolved analytes and information associated with an unresolved complex mixture, the method comprising:

obtaining the data in the two-dimensional chromatograph;

attenuating the information associated with the resolved analytes from the data to isolate the information associated with the unresolved complex mixture, wherein the data includes information associating intensity with first retention time in a first column of the chromatograph and second retention time in a second column of the chromatograph, and wherein the information is attenuated by:

deriving raw one-dimensional representations for a plurality of second-dimension retention times that comprises data collected for each such second retention time, wherein each raw one-dimensional representation includes a number of points that reference first column retention time against intensity;

isolating the information representing an unresolved mixture that is included in the data in each of the raw one-dimensional representations so that the information related to the resolved analytes contained therein is attenuated, wherein the information is isolated by:

deriving a minimum one-dimensional representation for each raw one-dimensional representation;

smoothing each of the derived minimum one-dimensional representations to yield smoothed minimum one-dimensional representations; and applying a correction value to the smoothed minimum one-dimensional representations; and recombining the one-dimensional representations comprising the isolated information to yield a two-dimensional representation of the unresolved mixture; and modifying a visual output representing the data that shows the information associated with the unresolved complex mixture with the information associated with the resolved analytes muted.

10. A method for processing data in a two-dimensional chromatograph as set forth in claim 9, wherein the steps of deriving a minimum one-dimensional representation for each raw one-dimensional representation and smoothing each of the derived minimum one-dimensional representation comprises:

for each point in each one-dimensional representation, each a subject point: (a) identifying a lowest intensity value [I(minimum)] of N points most proximate to the subject point, and (b) upon identifying the lowest intensity value [I(minimum)] for such N points, determining the mean of the identified lowest intensity values [I(minimum)] for the nearest N points to the subject point, and (c) assigning the determined mean as the smoothed minimum intensity [I(smoothed minimum)] for the subject point.

11. A method for processing data in a two-dimensional chromatograph as set forth in claim 10, where N is 11.

12. A method for processing data in a two-dimensional chromatograph as set forth in claim 9, wherein the step of applying a correction value comprises:

for each point in each smoothed minimum one-dimensional representation, each a subject point: (a) referencing Y points most proximate to the subject point, (b) for each referenced point, determining a difference of the minimum intensity for such point from a raw intensity of such point, (c) sorting the determined differences in ascending order, (d) computing the Hodges Lehmann statistic on the bottom fifty-percent of the sorted determined differences, and (e) adding that statistic to the smoothed minimum intensity [I(smoothed minimum)] for the subject point to yield a corrected smoothed minimum intensity [I(corrected smoothed minimum intensity)] for such point.

13. A method for processing data in a two-dimensional chromatograph as set forth in claim 8, wherein the step of deriving comprises:

subtracting the isolated information associated with the unresolved complex mixture from the data to yield the resolved peaks.

* * * * *